United States Patent [19]

Weber et al.

[11] Patent Number: 4,618,034
[45] Date of Patent: Oct. 21, 1986

[54] BRAKE SHOE RETENTION APPARATUS

[75] Inventors: James L. Weber, West Bloomfield; Donald J. Davidson, Troy, both of Mich.

[73] Assignee: Rockwell International Corporation, Pittsburgh, Pa.

[21] Appl. No.: 713,135

[22] Filed: Mar. 18, 1985

[51] Int. Cl.⁴ .............................................. F16D 65/02
[52] U.S. Cl. ................................ 188/73.36; 188/73.38; 188/73.39
[58] Field of Search ............... 188/73.35, 73.36, 73.37, 188/73.38, 205 A, 73.39; 192/30 V

[56] References Cited

U.S. PATENT DOCUMENTS

| 3,298,469 | 1/1967 | Robinette | 188/73.38 X |
| 3,625,314 | 12/1971 | Rinker | 188/73.35 X |
| 4,162,721 | 7/1979 | Moriya | 188/73.38 |

Primary Examiner—Duane A. Reger
Assistant Examiner—Richard R. Diefendorf

[57] ABSTRACT

Brake shoes for a disc brake assembly are held radially inward against ledge areas in a caliper and its support plate by plates bolted to the caliper. The plates extend axially and include first bolt receiving lateral portions and second brake shoe hold down portions which are angularly related. The angle is greater than a corresponding angle between the outer surfaces of the brake shoes and the bolt receiving surface in the caliper so that the brake shoes are pressed downward against the ledge as the bolts are tightened. One retention plate has an additional angularly related portion which urges the brake shoes in the direction of normal rotation of the disc.

3 Claims, 5 Drawing Figures

BRAKE SHOE RETENTION APPARATUS

BACKGROUND OF THE INVENTION

One of the significant problems encountered in disc brake usage in that brake shoes must be firmly held in radial and circumferential position while permitting their movement in axial directions. The holding of the brake shoes, while permitting their axial movement, presents difficulties.

Another problem inherent in brake shoes is that vibrations may be encountered due to the necessity of mounting the shoes for axial sliding. Vibrations are disturbing to the vehicle operator and, if severe, could cause undue wear of the brake shoes and lining secured thereto.

The present invention seeks to solve the problems of undesirable vibration and retention of the brake shoes in radial and circumferential positions while permitting movement in axial directions.

SUMMARY OF THE INVENTION

The present invention solves the problems of radial and circumferential fixing while permitting axial sliding and preventing vibration by means of two hold down retainer clips secured to a holder. The clips are transverse leaf springs which maintain constant downward load on the shoes as the linings wear. The heavy duty clips are resiliently deformed as they are installed and secured by retaining bolts.

Brake shoes for disc brakes are held radially inward against ledge areas in a caliper or its supporting plate by plates bolted to the caliper. The plates extend axially and are comprised of a first bolt receiving lateral portion and second brake shoe hold down portion which are angularly related. The angle is greater than a corresponding angle between the outer surfaces of the brake shoes and the bolt receiving surfaces in the caliper so that as the bolts are tightened, the brake shoes are pressed downward against the ledge. One retention plate has an additional angularly related portion which urges the brake shoes in a direction of normal rotation of the disc.

The preferred brake shoe retention apparatus for holding brake shoes in disc brake calipers is comprised of elongated axially extending plates having first flat fastener receiving portions and second flat brake shoe hold down portions. The second portions are angularly related to the first portions along axially extended crease lines. The brake shoes are inserted in a caliper, and the hold down portions of the plates are positioned over edges of the brake shoes. Fasteners are connected to the fastener portions and to mounting surfaces on the caliper. The hold down portions of the plates urge the shoes into position in the caliper and hold the shoes in position in the caliper during usage and wear of the shoes.

In preferred embodiments the fastener receiving portions are elongated portions with plural holes for receiving bolts for inserting through the holes and for connecting to the caliper. In one preferred embodiment, the plural holes comprises first and second holes for receiving first and second bolts.

Preferably, the hold down portion and the mounting portion define a uniform angle having an apex at the crease line. In a preferred embodiment, the angle defined by an intersection of the hold down portion and the mounting portion is greater than an angle defined by the caliper connection mounting surface and the brake shoes. Connecting the mounting portion to the caliper connection mounting surface resiliently deforms the plate and urges the hold down portion into continuous contact with the brake shoes.

In preferred embodiments, the plates comprise first and second paired plates. One plate is configured for positioning at a leading end of the brake shoes in the direction of usual rotation of a disc which the brake shoes stop. A second plate is configured for mounting at the trailing end of the brake shoes with respect to the usual rotation of the disc of the brake apparatus. The plate configured for mounting at the leading portion of the brake shoes has an additional elongated portion connected to the hold down portion remote from the mounting portion of the plate. The additional portion is connected at an angle to the central hold down portion for urging the shoes, especially while the brake assembly is inoperative, in the direction of usual rotation of the disc toward the second plate at the trailing end of the brake shoes.

A preferred apparatus for mounting brake shoes in a caliper of a disc brake assembly has brake shoe receiving ledge areas in the caliper and its support plate for supporting the leading and trailing edge portions of axially outer and inner brake shoes respectively and threaded mounting holes in the caliper adjacent the brake shoe receiving areas for receiving bolts.

The threaded holes in the caliper extend through surfaces which are at an angle to the radially outer surface of the leading and trailing edges of the brake shoes and which are spaced from one end of the brake shoes.

Preferred hold down plates extend across the radially outer end surfaces of the brake shoes and across a rotor receiving area of the caliper. The hold down plates have elongated mounting portions with holes for aligning with mounting holes in the caliper to receive mounting bolts. The hold down plates have brake shoe contacting portions for contacting radially outer end surfaces of the brake shoes. The mounting portions and contacting portions are substantially longitudinally coextensive, and the contacting portions and mounting portions of the hold down plates are angularly related to one another. An angle between the mounting portions and the brake shoe contacting portions is greater than a corresponding angle between caliper connection mounting surfaces having threaded openings for receiving the mounting bolts and the radially outer surfaces at the leading and trailing ends of the brake shoes which are contacted by the contacting portions. Bolts extending through the holes in the mounting portions into threaded bores in the caliper resiliently bend the contacting portions of the plates, thereby resilient urging the axially outer and inner brake shoes into contact with the brake shoe receiving ledge areas in the caliper and its support plate respectively.

Preferably, one of the plates further comprises a pushing portion spaced from the mounting portion by the brake shoe contacting portion and being bent at an angle to the contacting portion for pushing the brake shoes in the direction of usual rotation of the rotor.

These and further objects and features of the invention are apparent in the disclosure which includes the above and on going specification with the claims and the drawings.

DETAILED DESCRIPTION OF THE DRAWINGS

Figure 1:
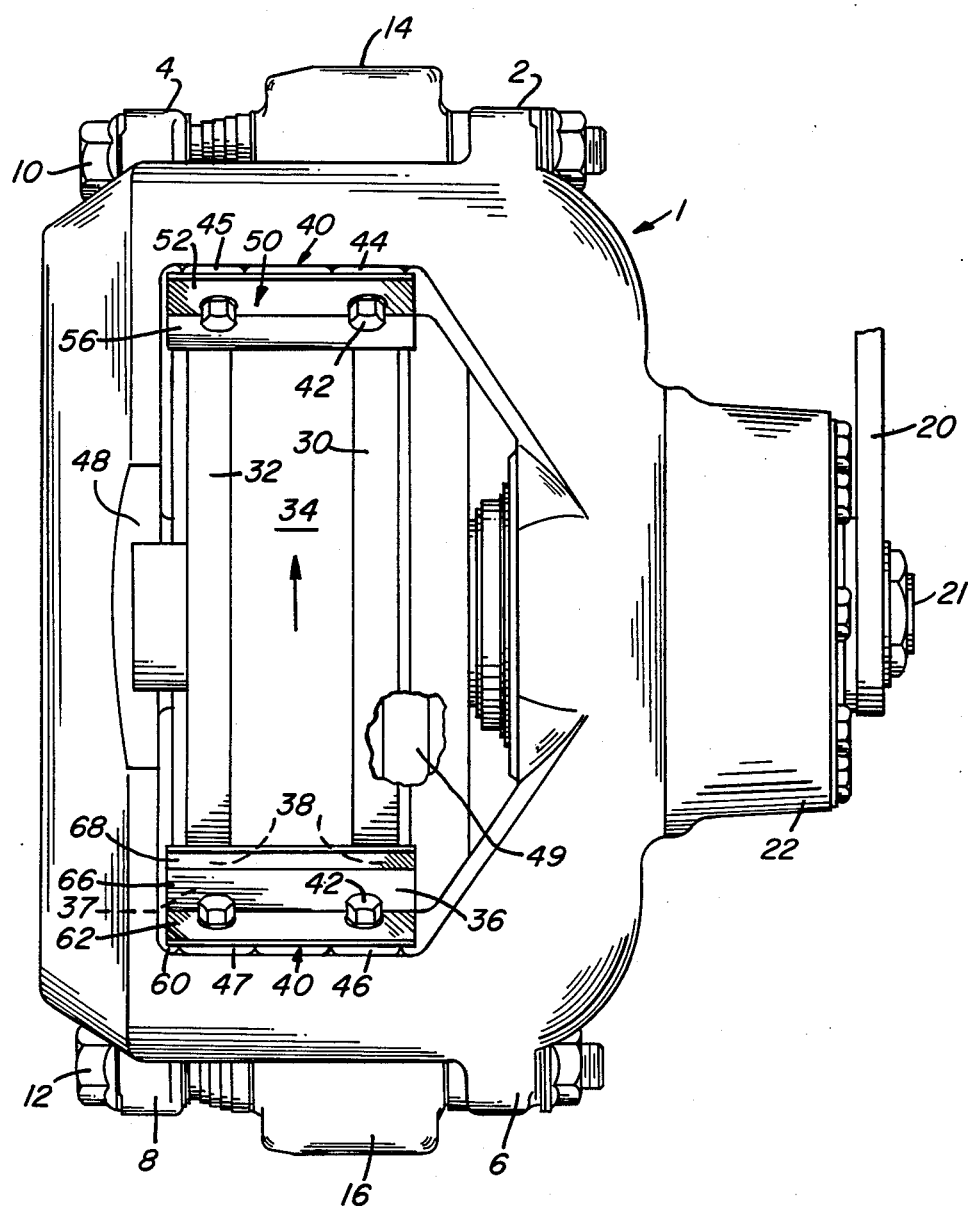
FIG. 1 is a top plan view of a caliper showing the brake shoe retention clips holding down brake shoes on opposite sides of a disc.

Referring to FIG. 1, a disc brake caliper is generally indicated by the numeral 1. Caliper 1 has four lugs, 2, 4, 6 and 8 which are mounted on parallel mounting pins 10 and 12. Mounting pins 10 and 12 slide through fixed arms 14 and 16 of a caliper support plate sometimes referred to as a spider which is connected to an axle housing and which thereby supports the caliper 1 and the brake actuator. The brake actuator includes an actuating arm 20 pivoted by a pneumatic cylinder (not shown) to effect rotary movement of a shaft 21.

The actuator lever 20 operates through cam arrangements in actuator housing 22 to move piston 24 to the left as shown in FIG. 1. The equal and opposite reaction causes the caliper assembly to move slightly to the right as shown in FIG. 1, sliding along pins 10 and 12. In so doing, brake shoes 30 and 32 are pressed against opposite surfaces of disc 34 causing the rotor disc 34 and the wheel secured thereto to retard. The brake shoes 30 and 32 have linings attached on faces which are directed toward disc 34. Retainer clips generally indicated by the numeral 40 are employed to hold those linings and brake shoes in position. Bolts 42 engage in threaded holes in sloped surfaces 44 and 46 of the caliper.

Figure 2:
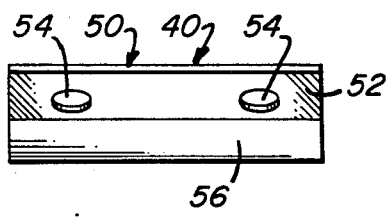
FIG. 2 is a top plan view of the retention clip for the trailing ends of the brake shoes.
Figure 3:
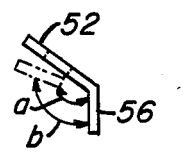
FIG. 3 is a side elevational view of the retention clip of FIG. 2.

In a preferred embodiment as shown in the drawings, the two hold down plates 40 are dissimilar. The hold down plate for the trailing ends of the brake shoes 30, 32, generally indicated by the numeral 50 as shown in FIGS. 2 and 3, has a first portion 52 which lies adjacent surface 44 of the caliper. Openings 54 in the first portion 52 receive securing bolts 42 which respectively engage threads in complementary bores in surfaces 44 and 45 of the caliper. The second portion 56 overlies upper surfaces of the brake shoes 30 and 32. As shown in FIG. 3, the angle between portions 52 and 56 of the hold down clip 50 is greater than a corresponding angle between caliper surfaces 44 and 45 and the radially outer surfaces at the trailing ends of brake shoes 30 and 32. As the bolts 42 are tightened, the spring clip retainer flexes from angle a to angle b insuring the continued hold down force against the trailing ends of the brake shoes 30 and 32.

Figure 4:
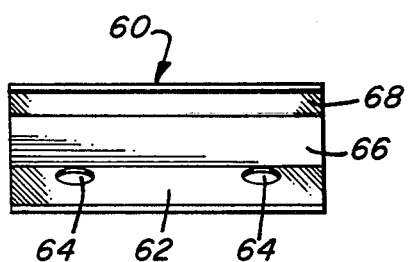
FIG. 4 is a top plan view of the retention clip for the leading ends of the brake shoes.
Figure 5:
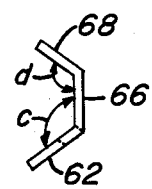
FIG. 5 is a side elevational view of the retention clip shown in FIG. 4.

As shown in FIG. 4 and 5, the hold down clip for the leading ends of the brake shoes 30, 32 is generally indicated by the numeral 60 and has a first portion 62 for overlying surfaces 46 and 47 of the caliper 1. Openings 64 receive bolts 42. A central portion 66 of the hold down clip 60 engages the radially outer or upper surfaces at the leading ends of brake shoes 30 and 32 pushes the underlying portions 36 and 37 of the brake shoes downward causing the radially inne surfaces of the brake shoes 30 and 32 to respectively abut against the ledge 49 in the caliper support plate and the ledge 48 in the caliper.

Hold down clip 60 also has a portion 68 which presses against sloped surface 38 of the brake shoes to urge the brake shoes 30 and 32 in the direction of normal rotation of disc 34 as shown by the arrow in FIG. 1, to bias the opposite or trailing ends of the brake shoes 30 and 32 toward the hold down plate 50 and by maintaining the trailing ends of the brake shoes in abutment with the caliper and its supporting plate thereby preventing initial tangential or circumferential movement of the brake shoes 30 and 32 as the brake is applied. As shown in FIG. 5, angles c and d between portions 62 and 66 of hold down clip 60 and between portions 66 and 68 respectively are greater than the angles between corresponding surfaces 46 and 36 on the caliper and brake shoes and 36 and 38 on the brake shoes. When bolts 42 are tightened, angles c and d are decreased, which results in a continuous resilient downward force on the upper surfaces 36 of the brake shoes and a continuous resilient force on surface 38 to urge brake shoes 30 and 32 in the upward direction as shown in FIG. 1.

In the preferred embodiment, the retainer plates generally indicated by the numeral 40 are transverse load springs which are formed from alloyed steel which is bent and heat treated to provide the necessary resiliency. The brake shoes 30 and 32 may slide slightly axially (in a left and right direction as shown in FIG. 1) beneath the hold down portions 56 and 66 of the spring retainer clips 50 and 60. The clips insure that the shoes 30 and 32 may not move radially (in and out of the plane of the paper of FIG. 1) and the portion 68 of spring clip 60 biases the shoes 30 and 32 in the direction of normal rotation of disc 34 (in an upward direction as shown in FIG. 1).

While the invention has been described with reference to a specific embodiment, modifications and variations of the invention may be constructed without departing from the scop of the invention as defined in the following claims.

I claim:

1. Apparatus for mounting a pair of brake shoes in a disc brake assembly having a caliper slidably mounted to a support plate comprising, ledge means in the caliper and its support plate for respectively supporting one of (a) said pair of brake shoes, threaded mounting holes in the caliper adjacent the ends of each said brake shoe for receiving mounting bolts, the threaded holes in the caliper extending through plate mounting sufaces of the caliper which are at an angle to radially outer surfaces of the brake shoes adjacent said threaded holes, hold down plates for extending across said radially outer surfaces of said brake shoes and across a rotor receiving area of the caliper, said hold down plates having elongated mounting portions with holes aligned with said threaded mounting holes in the caliper to receive said mounting bolts, said hold down plates having brake shoe contacting portions for contacting said radially outer surfaces of said brake shoes, said mounting portions and said contacting portions of said hold down plates are substantially longitudinally coextensive and angularly related to one another and wherein an angle between the mounting portions and the brake shoe contacting portions of each hold down plate is greater than a corresponding angle between the respective plate mounting surfaces of the caliper and the radially outer surfaces of said brake shoes which are contacted by the contacting portions of said hold down plate wherein bolts extending through the holes in the mounting portions of said hold down plates and into the threaded mounting holes in the caliper resiliently bend the contacting portions of said hold plates thereby resiliently urging said brake shoes into contact with said ledge means.

2. The apparatus of claim 1 wherein said hold down plates comprise first and second paired plates with one plate configured for mounting at the leading edges of said brake shoes and said one plate includes a portion spaced from the mounting portion by the brake shoe contacting portion and being bent at an angle to the contacting portion for biasing said brake shoes in the direction of usual rotation of the rotor.

3. Brake shoe retention apparatus for holding brake shoes in a disc brake assembly having a caliper slidably mounted to a support plate comprising:

a pair of elongated axially extending plates with one plate configured for positioning at a trailing end of the brake shoes in the direction of usual rotation of a disc which the brake shoes stop, the second plate configured for mounting at the leading end of the brake shoes with respect to the usual rotation of said disc and each of said plates having a first flat fastener receiving portion and a second flat brake shoe hold down portion, said first and second portions of each plate defining a uniform angle having an apex at an axially extending crease line, said second plate having an additional elongated portion connected at an angle to the hold down portion of said second plate remote from the mounting portion of said second plate, a plurality of holes in each fastener receiving portion of each plate, each of said holes being adapted to receive a bolt inserted therethrough for mounting its respective plate to a mounting surface of the caliper, said uniform angle between said first and second portions of each plate is greater than an angle defined by radially outer surfaces of the brake shoes and the caliper mounting surface adjacent that plate, whereby when the brake shoes are inserted in said caliper and the hold down portions of said plates are positioned over their respective edges of said brake shoes and said fastener receiving portions of said plates are mounted by said bolts to said mounting surfaces of the caliper each of said plates are resiliently deformed with the hold down portion of each said plate urged into continuous contact with the radially outer surfaces of the brake shoes and the angle between the additional elongated portion and the hold down portion of said second plate is such that said additional portion urges the brake shoes while inoperative in the direction of usual rotation of the disc toward said one plate.

* * * * *